(12) United States Patent
Thibault (10) Patent No.: US 11,761,662 B2
(45) Date of Patent: Sep. 19, 2023

(54) METHOD AND APPARATUS FOR INTELLIGENT TEMPERATURE CONTROL (71) Applicant: Universal Electronics Inc., Scottsdale, AZ (US)

(72) Inventor: Thomas Thibault, Carlsbad, CA (US)

(73) Assignee: Universal Electronics Inc., Scottsdale, AZ (US)

(*) Notice: Subject to any disclaimer, the term of this patent is extended or adjusted under 35 U.S.C. 154(b) by 909 days.

(21) Appl. No.: 15/859,573

(22) Filed: Dec. 31, 2017

(65) Prior Publication Data

US 2019/0203965 A1 Jul. 4, 2019

(51) Int. Cl.
| | |
|---|---|
| *G05B 21/00* | (2006.01) |
| *G01M 1/38* | (2006.01) |
| *G05B 13/00* | (2006.01) |
| *G05B 15/00* | (2006.01) |
| *G05D 23/00* | (2006.01) |
| *F24F 11/46* | (2018.01) |
| *F24F 11/64* | (2018.01) |
| *F24F 11/65* | (2018.01) |
| *F24F 11/67* | (2018.01) |
| *F24D 19/10* | (2006.01) |
| *G05B 13/02* | (2006.01) |

(Continued)

(52) U.S. Cl.
CPC .......... *F24F 11/46* (2018.01); *F24D 19/1084* (2013.01); *F24F 11/58* (2018.01); *F24F 11/61* (2018.01); *F24F 11/64* (2018.01); *F24F 11/65* (2018.01); *F24F 11/67* (2018.01); *G05B 13/026* (2013.01); *F24F 2110/10* (2018.01); *F24F 2110/12* (2018.01); *F24F 2120/10* (2018.01); *F24F 2130/10* (2018.01); *F24F 2221/54* (2013.01); *G05B 2219/2614* (2013.01)

(58) Field of Classification Search
CPC combination set(s) only.
See application file for complete search history.

(56) References Cited

U.S. PATENT DOCUMENTS

| | | | |
|---|---|---|---|
| 2012/0016524 A1* | 1/2012 | Spicer | G05B 15/02 700/276 |
| 2012/0065783 A1 | 3/2012 | Fadell et al. | |

(Continued)

FOREIGN PATENT DOCUMENTS

| | | |
|---|---|---|
| GB | 2518985 B | 11/2015 |
| WO | 2011/149600 A2 | 12/2011 |

(Continued)

OTHER PUBLICATIONS

ISA/US, International Search Report and Written Opinion issued on PCT application No. US18/66542, dated Mar. 8, 2019, 8 pages.

(Continued)

*Primary Examiner* — Zhipeng Wang
(74) *Attorney, Agent, or Firm* — Greenberg Traurig, LLP (57) ABSTRACT

Various ways to control the ambient temperature of a room in a structure are described. In one embodiment, a method for intelligently controlling an ambient room temperature in a structure is described, comprising receiving a future outdoor temperature forecast related to a geographic area where the structure is located, and altering a temperature profile for controlling the ambient room temperature based on the future outdoor temperature forecast.

14 Claims, 4 Drawing Sheets

(51) Int. Cl.
  *F24F 11/61*    (2018.01)
  *F24F 11/58*    (2018.01)
  *F24F 120/10*   (2018.01)
  *F24F 110/10*   (2018.01)
  *F24F 110/12*   (2018.01)
  *F24F 130/10*   (2018.01)

(56) References Cited

U.S. PATENT DOCUMENTS

| | | | |
|---|---|---|---|
| 2013/0193220 A1* | 8/2013 | Moll | F24F 11/0001 |
| | | | 236/44 C |
| 2015/0134124 A1* | 5/2015 | Carter | F24F 11/30 |
| | | | 700/278 |
| 2015/0167996 A1* | 6/2015 | Fadell | G05D 23/1917 |
| | | | 700/276 |
| 2015/0247647 A1* | 9/2015 | Kusukame | F24F 11/52 |
| | | | 700/276 |
| 2016/0201933 A1 | 7/2016 | Hester et al. | |
| 2017/0130979 A1* | 5/2017 | Kolavennu | F24F 11/30 |
| 2017/0354190 A1 | 12/2017 | Cauchy | |

FOREIGN PATENT DOCUMENTS

| | | |
|---|---|---|
| WO | 2016/200855 A1 | 12/2016 |
| WO | 2017/058403 A1 | 4/2017 |

OTHER PUBLICATIONS

EPO, extended European Search Report issued on European patent application No. 18894032.4, dated Jan. 20, 2022, 11 pages.

* cited by examiner

METHOD AND APPARATUS FOR INTELLIGENT TEMPERATURE CONTROL

BACKGROUND

I. Field of Use

The present application relates generally to the heating, ventilation and air conditioning arts. More specifically, embodiments of the present invention relate to intelligent temperature control of rooms inside of structures.

II. Description of the Related Art

Thermostats have been used for decades to control room temperatures based on user settings and temperature sensors commonly built into the thermostats. Thermostats typically control heating and/or cooling equipment by turning the equipment on or off. For example, when a room temperature where a thermostat is located drops below a setpoint, the thermostat sends a signal to heating equipment to begin heating the room. When the setpoint has been achieved or exceeded, the thermostat sends another signal to the heating equipment to turn off.

As digital electronics and microprocessors became widespread, thermostats became capable of being programmed with multiple setpoints, each setpoint related to a particular time of day. So, users could automatically control room temperature at different times of the day, for instance, when waking, leaving for work, returning from work and going to bed.

Recently, thermostat manufacturers have added a capability to learn the habits of occupants, and to automatically adjust setpoint temperatures and times based on past habits They are typically based on a machine learning algorithm: for the first weeks users generally have to regulate the thermostat in order to provide a reference data set. Then, the thermostat can learn occupants' schedules, at which temperature they are used to and when. Using built-in sensors and phones' locations, it can shift into energy saving mode when it realizes nobody is at home.

While these new class of thermostats are far more advanced and offer many more features than their predecessors, they make decisions based on past data only.

It would be desirable for thermostats to better control room temperatures.

SUMMARY

Embodiments of the present invention are directed towards intelligent ways to control ambient room temperatures. In one embodiment, a method for intelligently controlling an ambient room temperature in a structure is described, comprising receiving a future outdoor temperature forecast related to a geographic area where the structure is located, and altering a temperature profile for controlling the ambient room temperature based on the future outdoor temperature forecast.

In another embodiment, a method is described for intelligently controlling an ambient room temperature in a structure, comprising, receiving a current outdoor temperature reading related to a geographic area where the structure is located, and altering a heating ramp start time when the current temperature is less than a predetermined threshold.

In yet another embodiment, a device for intelligently controlling an ambient room temperature in a structure is described, comprising a network interface, a memory for storing processor-executable instructions and a temperature profile comprising one or more temperature setpoints and temperature setpoint times, and a processor coupled to the network interface and the memory, for executing the processor-executable instructions that causes the device to receive, by the processor via the network interface, a future outdoor temperature forecast related to a geographic area where the structure is located, and alter at least one of the temperature setpoint times based on the future outdoor temperature forecast.

In yet still another embodiment, for intelligently controlling an ambient room temperature in a structure is described, comprising a network interface, a memory for storing processor-executable instructions and a temperature profile comprising one or more temperature setpoints and temperature setpoint times, and a processor coupled to the network interface and the memory, for executing the processor-executable instructions that causes the device to receive a current outdoor temperature reading related to a geographic area where the structure is located, and alter a heating ramp start time when the current temperature is less than a predetermined threshold.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention are directed towards a system, device and method to control ambient room temperatures. Ambient temperature control is enhanced using future temperature forecasts for a geographic area where a structure is located. The enhanced temperature control can be further refined by compiling a history of room temperatures vs. temperature settings, and determining heating/cooling effects when one or more doors or windows are open. Also described are several novel ways that thermostats can be configured to communicate with users under certain hostile conditions. Further discussion herein relates to providing access to thermostats, for example in hotel room settings.

Figure 1:
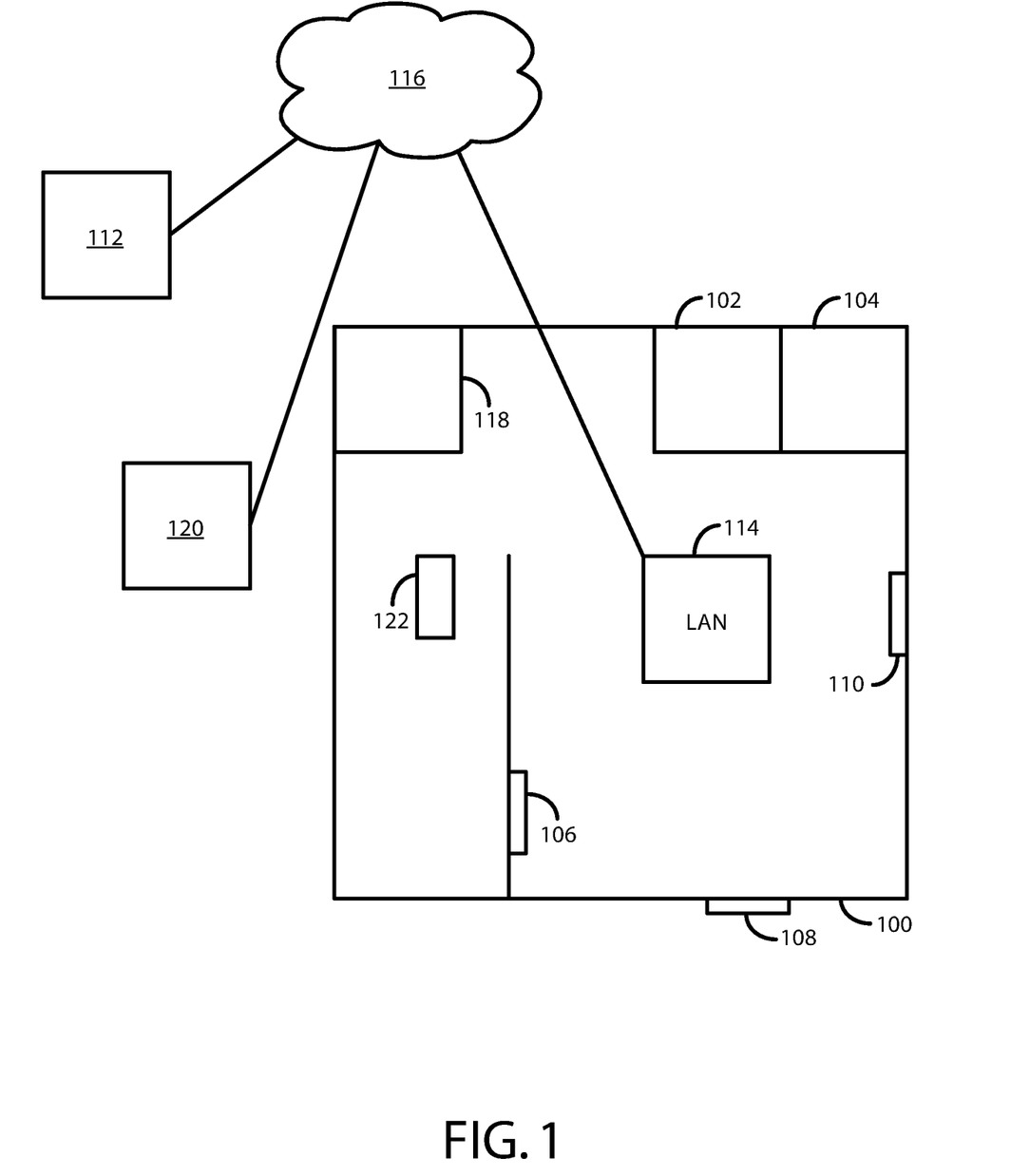
FIG. 1 is a top, plan view of a structure utilizing the inventive concepts discussed herein.

FIG. 1 is a top, plan view of a structure 100 utilizing the inventive concepts discussed herein. In this embodiment, structure 100 comprises a multi-room, single-story residence having a heating system 102, a cooling system 104 and a thermostat 106 that controls heating system 102 and cooling system 104. Structure 100 also comprises at least one entry door 108 and one window 110. Thermostat 106 comprises a temperature sensor that senses the ambient temperature of the room where thermostat 106 is located. In some embodiments, thermostat may be configured to receive two or more temperature sensor inputs from temperature sensors located in other parts of structure 100.

Like prior art thermostats, thermostat 106 receives temperature profiles from users in the form of desired temperature setpoints and times when these setpoints should be achieved. For example, a user may set thermostat 106 to warm the room where thermostat 106 is located to an ambient temperature of 74 degrees Fahrenheit at 7 am when the user typically wakes, to maintain a temperature of no less than 62 degrees at 8:30 am when the user leaves structure 100 to go to work, to set the room temperature to 74 degrees Fahrenheit at 6 pm when the user returns from work, and to maintain a room temperature of no less than 60 degrees Fahrenheit at 10 pm when the user typically goes to bed. As each of the times set by the user in the temperature profile near, thermostat 106 sends signals to heating system 102 or cooling system 104 to begin or stop heating or cooling, depending on the temperature setpoint for each setpoint time (i.e., waking, leaving, returning, retiring) and the ambient air temperature in the room where thermostat 106 is located.

To achieve the temperature setpoints at the times specified in the temperature profile, thermostat 106 typically begins heating or cooling before the set time for each temperature setpoint. In this way, the desired room temperature will be achieved at the time desired by the user. This is known in the art as "thermal ramping" or simply, "ramping". Prior art thermostats may be pre-programmed to begin ramping a predetermined, fixed time period before each setpoint time, such as 15 minutes or 30 minutes. However, thermostat 106 calculates one or more ramp times for one or more setpoints, respectively, using future outdoor temperature forecasts, results from previous ramping efforts, and detection of open doors and/or windows.

In one embodiment, thermostat 106 is coupled to weather forecast server 112 via a local area network 114, such as a home Wi-Fi router and modem, and a wide-area network 116, such as the Internet. Thermostat 106 may be provided with current and future weather information in a geographic area where structure 100 is located. Such future current and future weather information may comprise current and future outdoor temperature forecasts, precipitation predictions, wind speed and direction, cloud coverage, and other current and future weather-related information. Thermostat 106 may be programmed by a user with information pertaining to the thermostat's location, typically by entry of a city and state, or the location may be determined by the weather forecast server 112 based on an IP address assigned to thermostat 106. In any case, weather forecast server 112 provides current and future weather information to thermostat 106 upon request from thermostat 106, for example at predetermined time intervals, or on a "push" basis as updates become available from weather forecast server 112.

Thermostat 106 may use the current and future weather information to calculate custom ramp times for one or more setpoints. For example, if the local outdoor temperatures are expected to cool significantly over the next 24 hours, thermostat 106 may create or modify a ramp time when a heating cycle begins the following morning, by beginning a heating cycle earlier than normal. If a warming trend will be occurring in the next several days, thermostat 106 may begin a heating cycle later than normal, or begin a cooling cycle earlier than normal.

In one embodiment, thermostat 106 uses future weather information in conjunction with past heating and cooling cycle information to determine a custom ramp time. Thermostat 106 may store previous heating and cooling information, such as setpoints, heat/cool ramp start times, resultant room temperature(s) and outdoor temperature information during the ramps to determine a relationship between room temperatures, outdoor temperatures, desired room temperatures and the time it takes to ramp to such desired room temperatures. This is explained in greater detail later herein.

In another embodiment, thermostat 106 may utilize current and future weather information, and/or past heating and cooling cycle information, and/or door and/or window status information to determine custom ramp times. In this embodiment, a status of one or more doors and/or windows is provided to thermostat 106, either directly via wireless sensors that monitor doors or windows in structure 100, or via a home security panel 118. The status of each door or window comprises either "open" or "closed". In some embodiments, an amount that a door or a window is open may also be provided, such as "18 inches", or "3 feet, 6 inches" in embodiments where such detailed status information is provided by the sensors. Thermostat 106 may record resultant room temperatures during thermal ramping and additionally record the status of one or more doors or windows. Such door and/or window status information may skew the time needed to achieve setpoints. For example, if the outdoor temperature is 30 degrees, and the indoor room temperature is 60 degrees, and a desired room temperature at 7 am is 72 degrees, a standard ramp time may be determined to be 40 minutes. However, if a window is open, cold air from outside will enter through the open window and hamper the heating system's effort to bring the room to the desired temperature within the standard 40 minute ramp time. In this case, thermostat 106 tracks the room temperature during the ramp, and stores certain parameters from the ramp, such as how long it actually took to achieve the desired temperature, based on the outdoor temperature, the starting room temperature, the desired room temperature and the fact that one window was open. Then, the next time that similar circumstances present, i.e., the same or similar outdoor temperature, one window open, starting room temperature, and desired room temperature, thermostat 106 may alter the ramp time, increasing it to 50 minutes, in order to achieve the desired room temperature at the desired setpoint time.

In one embodiment, the calculations performed by thermostat 106 to determine custom ramp times may be performed by some other device or system, such as server 120. Server 120 may be coupled to thermostat 106 via wide-area network 116 and local-area network 114 and receive certain information from thermostat 107, such as current room temperatures, temperature profiles, occupancy information, and door/window status information. Server 120 may also be coupled to weather forecast server 112 to receive current and future weather information, in order to use such information to better control the heating and cooling of structure 100, as described previously.

Figure 2:
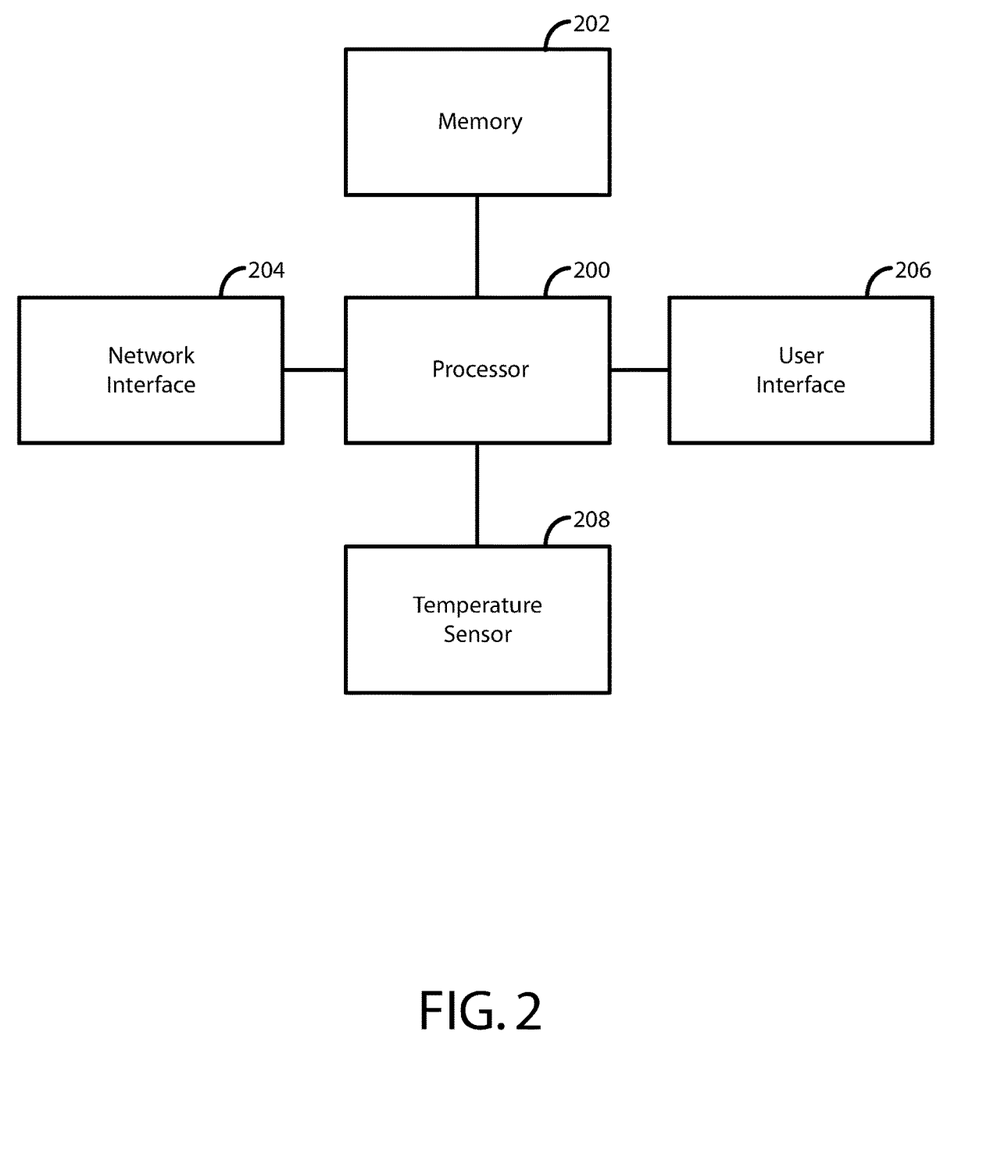
FIG. 2 is a functional block diagram of one embodiment of a thermostat or, alternatively, a server, as shown in FIG. 1.

FIG. 2 is a functional block diagram of one embodiment of thermostat 106 or server 120. FIG. 2 shows processor 200, memory 202, network interface 204, user interface 206 and temperature sensor 208. It should be understood that in some embodiments, some functionality has been omitted for purposes of clarity, such as a power supply.

Processor 200 comprises one or more general-purpose microprocessors, microcontrollers and/or custom or semi-custom ASICs, and/or discrete components able to carry out the functionality required for operation of thermostat 106. Processor 200 may be selected based on processing capabilities, power-consumption properties, and/or cost and size considerations. In the case of a microprocessor, microcontroller, or ASIC, processor 200 generally executes processor-executable instructions stored in memory 202 that control the functionality of the intelligent personal assistant. Examples of memory include one or more electronic memories such as RAM, ROM, hard drives, flash memory, EEPROMs, UVPROMs, etc. or virtually any other type of electronic, optical, or mechanical memory device, but excludes propagated signals. In some embodiments, memory 202 may be incorporated into processor 200, such as in the case of a microcontroller having a certain amount of onboard static RAM, flash memory, or some other electronic memory capable of storing the processor-executable instructions and variable information, such as temperature profiles, current and future weather information, door/window status information, past ramping historical information (i.e., previous ramp information and the conditions that produced the previous ramp information, such as indoor/outdoor temperatures, door/window status, occupancy information, etc.).

Network interface 204 comprises circuitry necessary to transmit and receive information to and from other devices, such as security panel 118, weather forecast server 112, door/window sensors, server 120, and to user interface device 122 (user interface device comprising a smart phone, tablet computer, desktop computer, laptop computer, or other personal data device executing an "app" for controlling thermostat 106, for entering temperature profile information, etc.). Such circuitry is well known in the art and may comprise one or more of BlueTooth, Wi-Fi, or RF circuitry, among others.

User interface 206 comprises one or more keys, buttons, switches, touchpads, touchscreens, or other devices that allows a user to operate thermostat 106, and to enter information that may be used by thermostat 106, such as a location of structure 100, a square footage of structure 100, an age of structure 100, a number of stories that structure 100 has, etc.

Temperature sensor 208 comprises a device that provides electronic signals to processor 200 in accordance with the ambient air temperature surrounding thermostat 106. In some embodiments, temperature sensor 208 is not used, and thermostat 106 receives temperature readings from one or more temperature sensors located in one or more locations of structure 100. Temperature sensor 208 may comprise one of a thermistor, a resistive temperature detector, a thermocouple, semiconductor-type devices, or other temperature sensors known in the art.

Figure 3:
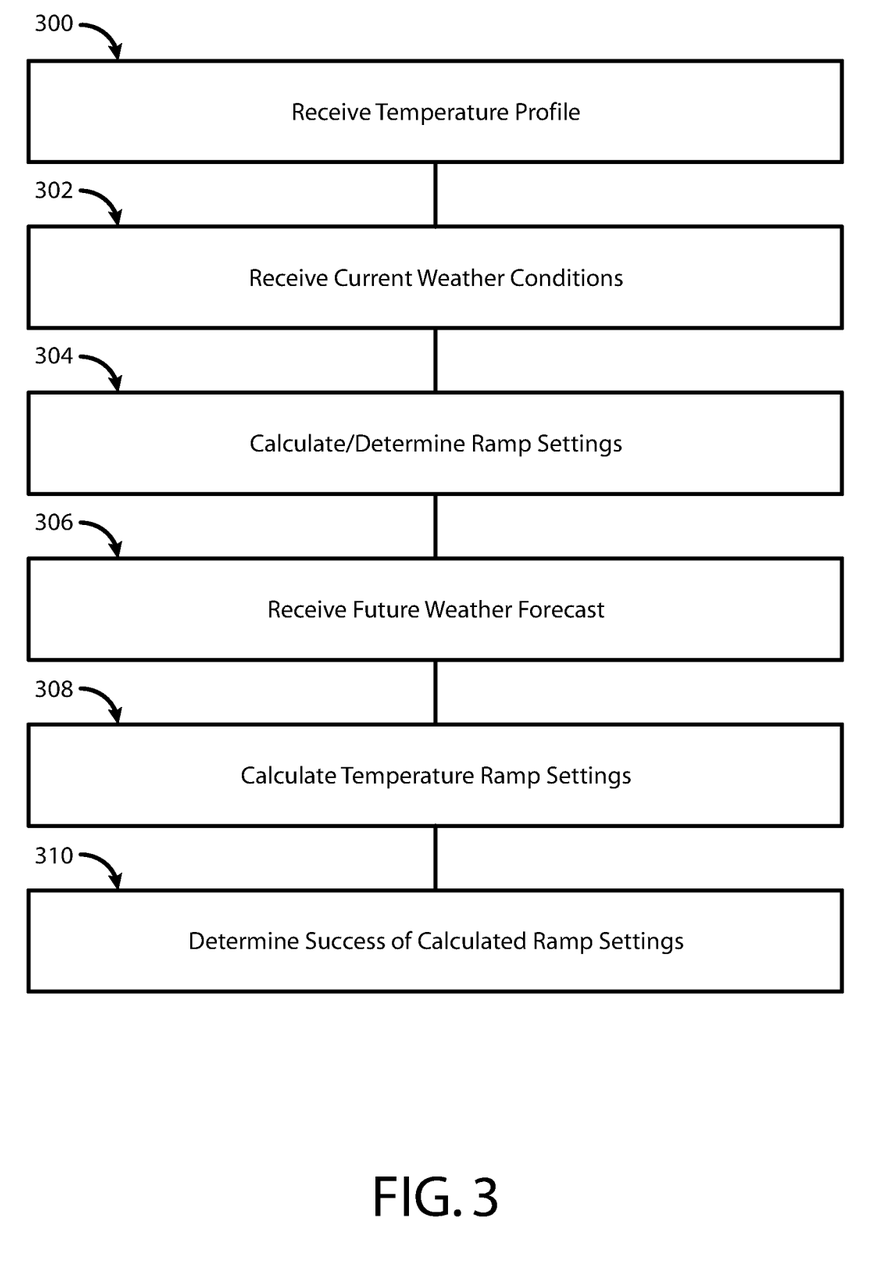
FIG. 3 is a flow diagram of one embodiment of a method, performed by either the thermostat or the server as shown in FIGS. 1 and 2, for intelligently controlling an ambient room temperature in a structure.

FIG. 3 is a flow diagram of one embodiment of a method, performed by thermostat 106, for intelligently controlling an ambient room temperature in a structure. It should be understood that the steps described in this method could be performed in an order other than what is shown and discussed and that some minor method steps may have been omitted for clarity and simplicity. It should also be understood that the functionality described in this method may be performed by a thermostat or by a server remotely located from a structure, where one or more room temperatures of the structure are provided to the sever via local area network 114 and wide-area network 116, and signals to control operation of heating system 102 and/or cooling system 104 may be provided from the server to theses systems, again via wide-area network 116 and local area network 114.

At block 300, thermostat 106 receives a temperature profile from a user, either via user interface 204 or user interface device 122. The temperature profile comprises one or more desired room temperatures in connection with times that the user would like to achieve the desired room temperatures. A commonly-used temperature profile allows a user to set several desired temperatures at various times during the day, such as a wake time, a leave time, an arrive time, and a sleep time. Processor 200 receives the temperature profile and stores it in memory 202.

At block 302, processor 200 may receive current weather conditions from weather forecast server 112. In another embodiment, current weather conditions may be received from a local temperature sensor installed outside of structure 100 and in communication with local-area network 114. In any case, processor 200 receives current weather conditions and typically stores the current weather conditions in memory 202. Such current weather conditions comprise temperature, barometric pressure, wind direction and/or speed, precipitation indications, and/or cloud coverage indications.

At block 304, processor 200 may calculate one or more temperature ramp settings in connection with one or more of temperature setpoints and setpoint times stored in the temperature profile in memory 202. In one embodiment, the ramp settings are programmed as default values into memory 202. For example, a temperature ramp start time may be set to 15 minutes, which means that processor 200 will begin a heating cycle or a cooling cycle, as the case may be, 15 minutes before any temperature setpoint time. Starting a heating or cooling cycle comprises processor 200 sending a start or stop command to heating system 102 or cooling system 104, to instruct heating system 102 or cooling system 104 to start or stop heating or cooling one or more rooms within structure 100.

At block 306, processor 200 may receive future weather forecasts from weather forecast server 112. Such future weather forecasts may comprise predicted temperatures barometric pressures, wind directions and/or speed, precipitation indications, and/or cloud coverage indications. Such future weather information may be provided as an hourly or daily forecast, extending into the future a number of days, such as ten days. For each time period (hour or day), predicted weather information may be provided by weather forecast server 112, as weather predictions are generated by weather forecast server 112. In one embodiment, one or more weather prediction updates are provided to processor 200 at predetermined time intervals, such as one hour or one day. In other embodiment, weather predictions are provided to processor 200 upon processor 200 requesting such weather prediction information from server 112 at predetermined time intervals, or upon the occurrence of a predetermined event, such as a user requesting an update via user interface 206 or device 122.

At block 308, processor 200 may calculate one or more temperature ramp settings in connection with one or more of the temperature setpoints stored in the temperature profile in memory 202, considering the future weather forecast information provided by weather forecast server 112. For example, if the temperature profile stored in memory 202 indicates that the interior of structure 100 should be at 72 degrees at 7 am each morning, processor 200 may calculate a start time when either heating system 102 or cooling system 104 should be activated in order to achieve the desired morning temperature setting of 72 degrees by the desired time of 7 am.

In one embodiment, a default ramp start time is stored in memory 202, such as 15 minutes. The default ramp start time may be stored in memory 202 during manufacturing of thermostat 106, or it may be programmed by a user. The default ramp start time is intended to achieve the desired temperature set point within the default ramp start time. However, the default ramp start time may not achieve the desired temperate setting within the ramp time when the temperature inside structure 100 is significantly different than the desired temperature set point. Other times, the desired temperature is achieved prior to the desired setpoint time, for example, when the ambient temperature inside structure 100 is close to the desired temperature setpoint. Processor 200 may alter the default ramp start time to begin sooner or later than the default ramp start time, depending on the future weather forecasts received from weather forecast server 112.

For example, processor 200 may receive a future weather forecast extending 7 days into the future, indicating that a warming trend will occur over the 7 day period, with local morning temperatures forecast to be 76 degrees on the first day of the forecast, and warming each day by 2 degrees. A stored profile indicates that the air temperature within structure 100 should be 72 degrees at 8 am each day. Normally, thermostat 106 would send a command to cooling system 106 to begin cooling 15 minutes before 8 am. However, processor 200 knows that the warming trend is approaching. In response, processor 200 may alter the default ramp start time for the following day, or for two or more of the 7 days in the forecast, to account for the warming temperatures outside structure 100 which may affect the indoor temperatures as well. For example, for every degree difference between a forecasted temperature and a baseline temperature, processor 200 may alter the ramp start time by 10 minutes. The baseline temperature could be preprogrammed into thermostat 106, be based on a present day's temperature readings, or be based on an average of temperatures over a given time period. An average baseline temperature for various times during the day may be provided to processor 200 either by weather forecast server 112 or by processor 200 storing reported outdoor temperatures in memory 202 and calculating an average for various times throughout the day and/or evening based on the previous, reported temperatures.

Returning to the example, on the morning of the first day of the forecast, i.e., the morning after processor 200 receives the future weather forecast from weather forecast server 112, processor may increase the ramp start time, increasing it from the default of 15 minutes, to 25 minutes, based on the 10 minute adjustment time per degree stored in memory 202. Thus, cooling system 106 will begin cooling the interior of structure 100 25 minutes before 7 am, rather than the default of 15 minutes.

When the future weather forecast indicates that local outdoor temperatures will be moderate, or near the desired setpoint(s), processor 200 may decrease the ramp start time, as less time will generally be needed to achieve the desired temperature set point(s).

Of course, for a cooling trend, similar calculations may be performed, increasing the ramp start time when the future weather forecast indicates that cooling temperatures are approaching, and decreasing ramp start times when the local outdoor temperatures are forecast to be only slightly cooler than desired temperature setpoints.

At block 310, processor 200 may determine how well the adjusted ramp start times are achieving the desired temperature setpoints at the desired setpoint times. This is accomplished by processor 200 storing one or more actual indoor temperatures, as provided by sensor 208 and/or other sensors, in memory 202 during a ramp period. In one embodiment, a temperature is recorded as a setpoint time is reached.

Processor 200 can compare the actual temperatures measured at the setpoint times to the desired temperatures at the setpoint times and determine a divergence therebetween. If little or no divergence is calculated, the adjustment to the ramp start time is deemed by processor 200 to be accurate. However, if the divergence varies more than a predetermined amount, such as by 2 degrees, processor 200 may further adjust the ramp start time in accordance with the divergence amount. For example, for every degree of divergence, processor 200 may increase the ramp start time by 5 minutes, or some other predetermined value.

Figure 4:
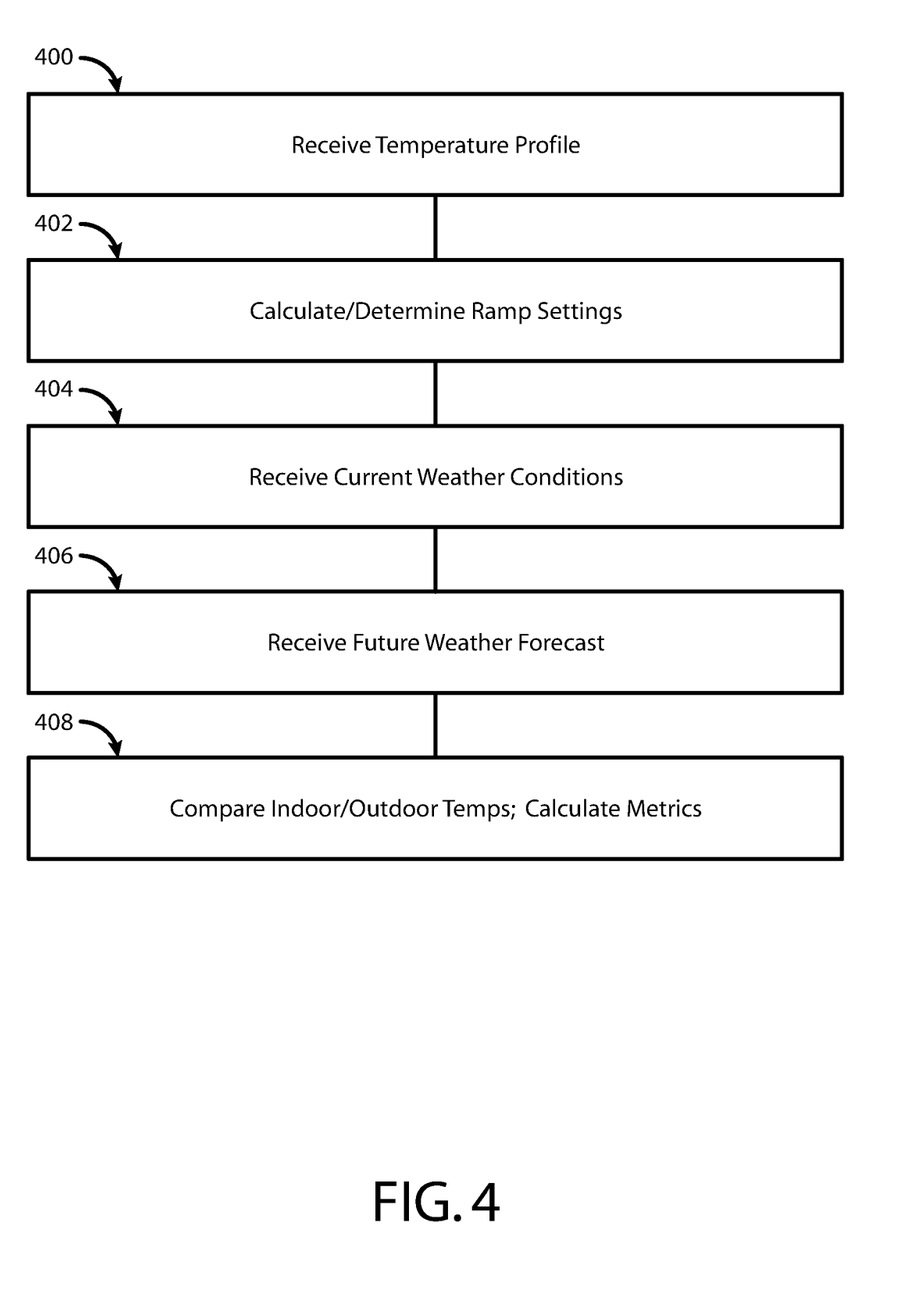
FIG. 4 is a flow diagram of another embodiment of a method, performed by either the thermostat or the server as shown in FIGS. 1 and 2, for intelligently controlling an ambient room temperature in a structure.

FIG. 4 is a flow diagram of one embodiment of a method, performed by thermostat 106, for intelligently controlling an ambient room temperature in a structure. It should be understood that the steps described in this method could be performed in an order other than what is shown and discussed and that some minor method steps may have been omitted for clarity and simplicity. It should also be clear that the method described in FIG. 4 may be processed in conjunction with the method of FIG. 3.

At block 400, thermostat 106 receives a temperature profile from a user, either via user interface 204 or user interface device 122. The temperature profile comprises one or more desired room temperatures in connection with times that the user would like to achieve the desired room temperatures. A commonly-used temperature profile allows a user to set several desired temperatures at various times during the day, such as a wake time, a leave time, an arrive time, and a sleep time. Processor 200 receives the temperature profile and stores it in memory 202.

At block 402, processor 200 may calculate one or more temperature ramp settings in connection with one or more of temperature setpoints and setpoint times stored in the temperature profile in memory 202. In one embodiment, the ramp settings are programmed as default values into memory 202. For example, a temperature ramp start time may be set to 15 minutes, which means that processor 200 will begin a heating cycle or a cooling cycle, as the case may be, 15 minutes before any temperature setpoint time. Starting a heating or cooling cycle comprises processor 200 sending a start or stop command to heating system 102 or cooling system 104, to instruct heating system 102 or cooling system 104 to start or stop heating or cooling one or more rooms within structure 100.

At block 404, processor 200 may receive current weather conditions from weather forecast server 112. In another embodiment, current weather conditions may be received from a local temperature sensor installed outside of structure 100 and in communication with local-area network 114. In any case, processor 200 receives current weather conditions and typically stores the current weather conditions in memory 202. Such current weather conditions comprise temperature, barometric pressure, wind direction and/or speed, precipitation indications, and/or cloud coverage indications.

At block 406, processor 200 may receive future weather forecasts from weather forecast server 112. Such future weather forecasts may comprise predicted temperatures barometric pressures, wind directions and/or speed, precipitation indications, and/or cloud coverage indications. Such future weather information may be provided as an hourly or daily forecast, extending into the future a number of days, such as ten days. For each time period (hour or day), predicted weather information may be provided by weather forecast server 112, as weather predictions are generated by weather forecast server 112. In one embodiment, one or more weather prediction updates are provided to processor 200 at predetermined time intervals, such as one hour or one day. In other embodiment, weather predictions are provided to processor 200 upon processor 200 requesting such weather prediction information from server 112 at predetermined time intervals, or upon the occurrence of a predetermined event, such as a user requesting an update via user interface 206 or device 122.

At block 408, processor 200 may begin comparing the local, outdoor temperatures from the current weather conditions to one or more indoor temperatures, as reported by one or more temperature sensors located within structure 100. In one embodiment, thermostat 106 comprises a temperature sensor that reports the ambient room temperature in proximity to thermostat 106 to processor 200. The temperature comparisons may be performed over a predetermined time period, such as a day, a week, a month, or more, or on a "rolling" basis, such over the past day, week, month or other predetermined time period. Processor 200 may use the comparisons to determine an insulation metric to predict how the indoor temperature will be affected by outdoor temperatures.

For example, each day, thermostat 106 may record an average local outdoor temperature of at 7 am, one of the setpoint times chosen by a user and stored in a temperature profile in memory 202. At the same time, thermostat 106 may record an average indoor temperature of 66 degrees, prior to the start of any heating or cooling for the morning, for example, taken 30 minutes prior to the setpoint time. In this example, the average indoor temperature is only 4 degrees higher than the average outdoor temperature. Thus, the insulation metric may indicate that structure 100 is well-insulated, as opposed to, for example, an outdoor/indoor temperature differential of 15 degrees, which the insulation metric may indicate that structure 100 is poorly insulated.

In one embodiment, thermostat 106 can receive insulation metrics from other structures nearby structure 100 as a way to compare the relative insulating capabilities of nearby structures. Other information could be compared, such as a square footage of each structure, whether each structure is one or two stories, an age of each structure, etc. In this way, thermostat 106 could provide relative insulation performance information to a user inside structure 100 based on the insulation metrics and other information of nearby structures. For example, 50 other homes could report their insulation metrics, square footage, number of stories, and structure ages to server 120, each using a thermostat similar to thermostat 106, and these metrics and information could be provided to thermostat 106 on the basis of a zip code, or other geolocation information, where structure 100/thermostat 106 is located. Processor 200 may then compare the insulation metric of structure 100 to these other metrics in accordance with the similarities of the structures, such as square footage, stories and/or age. For example, processor 200 may cause user interface 206 to display a ranking of structure 100's insulation metric as compared to homes having the same number of stories and within 10% of the square footage of structure 100. This may help a homeowner determine that structure 100 is most likely in need of additional insulation. In one embodiment, the relative insulation metric could be provided to device 122.

The methods or steps described in connection with the embodiments disclosed herein may be embodied directly in hardware or embodied in machine-readable instructions executed by a processor, or a combination of both. The machine-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. In the alternative, the processor and the storage medium may reside as discrete components.

Accordingly, an embodiment of the invention may comprise a non-transitory processor-readable media embodying code or machine-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A method for using a thermostat to intelligently control temperature in a structure, comprising:
    storing in a memory of the thermostat a user set temperature and a user set time;
    at the user set time, collecting by the thermostat a temperature inside the structure;
    determining by the thermostat a difference in degrees between the user set temperature and the temperature inside the structure; and
    using by the thermostat the determined difference in degrees between the user set temperature and the temperature inside the structure to automatically alter a start time at which the thermostat causes a one of a heating system and a cooling system to start a one of a heating process and a cooling process;
    wherein the thermostat alters the start time by a predetermined amount of time for each degree of difference between the user set temperature and the temperature inside the structure.

2. The method as recited in claim 1, further comprising receiving by the thermostat a data indicative of a forecast outdoor temperature and automatically further altering by the thermostat the start time as a function of the data.

3. The method as recited in claim 1, further comprising receiving by the thermostat a data indicative of a forecast amount of sunshine and automatically further altering by the thermostat the start time as a function of the data.

4. The method as recited in claim 2, wherein the data indicative of the forecast outdoor temperature is received from a remotely located weather service via use of a network interface coupled to the thermostat.

5. The method as recited in claim 3, wherein the data indicative of the forecast amount of sunshine is received from a remotely located weather service via use of a network interface coupled to the thermostat.

6. The method as recited in claim 1, further comprising using by the thermostat an insulation metric of the structure to automatically further adjust by the thermostat the start time.

7. The method as recited in claim 6, further comprising using by the thermostat the temperature inside the structure and a sensed temperature outside the structure to determine the insulation metric.

8. A thermostat for intelligently controlling a temperature in a structure, comprising:
- a network interface;
- a processing device coupled to the network interface; and
- a memory for storing processor-executable instructions, wherein the instructions, when executed by the processing device, cause the thermostat to perform steps comprising:
- storing in a memory of the thermostat a user set temperature and a user set time;
- at the user set time, collecting by the thermostat a temperature inside the structure;
- determining by the thermostat a difference in degrees between the user set temperature and the temperature inside the structure; and
- using by the thermostat the determined difference in degrees between the user set temperature and the temperature inside the structure to automatically alter a start time at which the thermostat causes a one of a heating system and a cooling system to start a one of a heating process and a cooling process;
- wherein the thermostat alters the start time by a predetermined amount of time for each degree of difference between the user set temperature and the temperature inside the structure.

9. The thermostat as recited in claim 8, wherein the instructions cause the thermostat to perform further steps comprising receiving by the thermostat a data indicative of a forecast outdoor temperature and automatically further altering by the thermostat the start time as a function of the data.

10. The thermostat as recited in claim 8, wherein the instructions cause the thermostat to perform further steps comprising receiving by the thermostat a data indicative of a forecast amount of sunshine and automatically further altering by the thermostat the start time as a function of the data.

11. The thermostat as recited in claim 9, wherein the data indicative of the forecast outdoor temperature is received from a remotely located weather service via use of a network interface coupled to the thermostat.

12. The thermostat as recited in claim 10, wherein the data indicative of the forecast amount of sunshine is received from a remotely located weather service via use of a network interface coupled to the thermostat.

13. The thermostat as recited in claim 8, wherein the instructions cause the thermostat to perform further steps comprising using by the thermostat an insulation metric of the structure to automatically further adjust by the thermostat the start time.

14. The thermostat as recited in claim 13, wherein the instructions cause the thermostat to perform further steps comprising using by the thermostat the temperature inside the structure and a sensed temperature outside the structure to determine the insulation metric.

* * * * *